United States Patent
Keen

(10) Patent No.: US 12,466,032 B2
(45) Date of Patent: Nov. 11, 2025

(54) METHOD OF MAKING A COATED ABRASIVE ARTICLE

(71) Applicant: 3M INNOVATIVE PROPERTIES COMPANY, St. Paul, MN (US)

(72) Inventor: Polly H. R. Keen, Cambridge (GB)

(73) Assignee: 3M Innovative Properties Company, St. Paul, MN (US)

( * ) Notice: Subject to any disclaimer, the term of this patent is extended or adjusted under 35 U.S.C. 154(b) by 531 days.

(21) Appl. No.: 17/910,313

(22) PCT Filed: Mar. 31, 2021

(86) PCT No.: PCT/IB2021/052696
§ 371 (c)(1),
(2) Date: Sep. 8, 2022

(87) PCT Pub. No.: WO2021/198951
PCT Pub. Date: Oct. 7, 2021

(65) Prior Publication Data
US 2023/0118971 A1    Apr. 20, 2023

Related U.S. Application Data

(60) Provisional application No. 63/004,920, filed on Apr. 3, 2020.

(51) Int. Cl.
*B24D 11/00* (2006.01)
*B24D 3/00* (2006.01)
*B24D 3/28* (2006.01)

(52) U.S. Cl.
CPC ............ *B24D 11/001* (2013.01); *B24D 3/002* (2013.01); *B24D 3/28* (2013.01)

(58) Field of Classification Search
CPC ...... B24D 11/001; B24D 3/002; B24D 3/001; B24D 3/00; B24D 3/28; B24D 3/20; B24D 3/02
See application file for complete search history.

(56) References Cited

U.S. PATENT DOCUMENTS

| | | | |
|---|---|---|---|
| 2,984,052 | A | 5/1961 | Mueller, Jr. |
| 5,219,462 | A | 6/1993 | Bruxvoort et al. |
| 6,613,113 | B2 | 9/2003 | Minick et al. |

(Continued)

FOREIGN PATENT DOCUMENTS

| | | |
|---|---|---|
| EP | 1038637 A2 | 9/2000 |
| EP | 0925151 B1 | 7/2003 |

(Continued)

OTHER PUBLICATIONS

International Search Report for PCT International Application No. PCT/IB2021/052696, mailed on Jun. 30, 2021, 4 pages.

*Primary Examiner* — Amber R Orlando
*Assistant Examiner* — Sarah Catherine Case
(74) *Attorney, Agent, or Firm* — Kathleen B. Gross; Bradford B. Wright

(57) ABSTRACT

A method of making a coated abrasive article includes disposing abrasive composite precursors on a major surface of a water-soluble film. The abrasive composite precursors are lightly contacted with a porous fibrous backing, and the abrasive composite precursors are hardened to form abrasive composites. Dissolving the water-soluble film provides the coated abrasive article.

7 Claims, 2 Drawing Sheets

(56) References Cited

U.S. PATENT DOCUMENTS

| | | |
|---|---|---|
| 8,142,531 B2 | 3/2012 | Adefris et al. |
| 8,142,532 B2 | 3/2012 | Erickson et al. |
| 8,142,891 B2 | 3/2012 | Culler et al. |
| 9,314,903 B2 | 4/2016 | Woo et al. |
| 10,245,704 B2 | 4/2019 | Eilers et al. |
| 2002/0026752 A1* | 3/2002 | Culler .................. B24D 3/28 451/539 |
| 2009/0017727 A1 | 1/2009 | Pribyl et al. |
| 2012/0000135 A1 | 1/2012 | Eilers et al. |
| 2012/0227333 A1 | 9/2012 | Adefris et al. |
| 2013/0040537 A1 | 2/2013 | Schwabel et al. |
| 2013/0125477 A1 | 5/2013 | Adefris |
| 2016/0280949 A1 | 9/2016 | Song et al. |

FOREIGN PATENT DOCUMENTS

| | | |
|---|---|---|
| JP | 58196974 A | 11/1983 |
| WO | 1995001241 A1 | 1/1995 |
| WO | 1998010896 A1 | 3/1998 |
| WO | 2015071752 A1 | 5/2015 |

\* cited by examiner

METHOD OF MAKING A COATED ABRASIVE ARTICLE

CROSS-REFERENCE TO RELATED APPLICATIONS

This application is a national stage filing under 35 U.S.C. 371 of PCT/IB2021/052696, filed Mar. 31, 2021, which claims the benefit of Provisional Application No. 63/004,920, filed Apr. 3, 2020.

TECHNICAL FIELD

The present disclosure broadly relates to methods of making coated abrasive articles.

BACKGROUND

Coated abrasive articles having an abrasive layer disposed on a porous and/or perforated backing are especially useful for abrading applications (e.g., sanding auto body filler) where dust removal during use is desired. However, coating of hardenable abrasive slurries onto very porous or open mesh backings is notoriously difficult due to the resin soaking into the mesh away from the surface, as well as the lack of surface material to deposit the resin on.

SUMMARY

Advantageously, the present disclosure provides a new method for making coated abrasive articles that have porous backings without having the problem of bleed-through of the hardenable abrasive slurry during manufacture. Further, if deployed as a patterned abrasive layer (e.g., a discontinuous array of abrasive composites) this method of typically produces flat-topped abrasive composites. Other coating methods (e.g., screen printing or stencil printing) typically produce more abrasive composites. Flat topped abrasive composites have advantages over domed abrasive composites due to their constant bearing area as they wear down. This results in more consistent cut performance during use.

In one aspect, the present disclosure provides, a method of making a coated abrasive article, the method comprising:
  disposing abrasive composite precursors on a major surface of a water-soluble film to provide a coated film, wherein the abrasive composite precursors comprise abrasive particles dispersed in a hardenable binder precursor;
  lightly contacting the abrasive composite precursors with a first major surface of a porous fibrous backing to provide a first laminate structure;
  hardening the hardenable binder precursor to provide a second laminate structure comprising abrasive composites secured to the porous fibrous backing; and
  dissolving the water-soluble film to provide the coated abrasive article.

As used herein:
  the term "hardenable" includes chemical reaction (i.e., curing) or another hardening means (e.g., drying with coalescence of a polymer dispersion); and
  the term "lightly contacting" means contacting with just sufficient force to achieve complete contact, but without sufficient force to cause appreciable depth penetration (e.g., less than 20 percent, preferably less than 10 percent) into the porous backing.

Features and advantages of the present disclosure will be further understood upon consideration of the detailed description as well as the appended claims.

Figure 1:
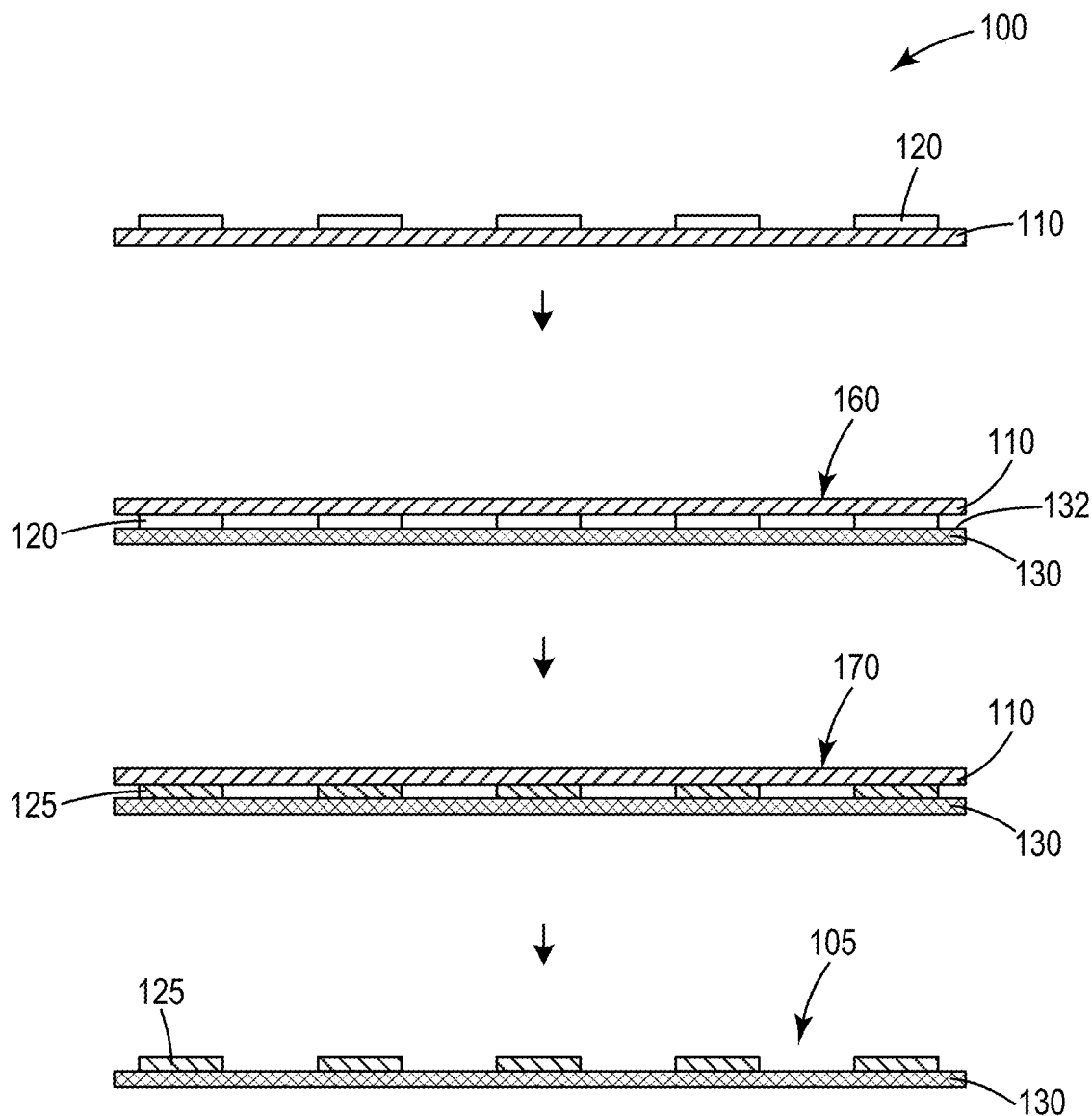
FIG. 1 is a schematic process flow diagram of exemplary process 100 according to the present disclosure.

Any repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Referring now to FIG. 1, in exemplary method 100 of making a coated abrasive article 105, abrasive composite precursors 120 are disposed on a water-soluble film 110. Next, the abrasive composite precursors 120 are lightly contacted with a first major surface 132 of a porous fibrous backing 130 to provide a first laminate structure 160. Then, the first laminate structure is heated (or otherwise hardened) such that the abrasive composite precursors 120 harden to form abrasive composites 125 secured to porous fibrous backing 130, thereby providing a second laminate structure 170. Subsequently, the water-soluble film 130 in second laminate structure 170 is dissolved to provide coated abrasive article 105.

The present method offers an alternative to other methods using transfer from a temporary backing. Problems with using other transfer methods may include that peeling of a temporary backing may cause damage to the abrasive composites or their precursors, or, if the transfer layer is a non-stick release backing, then the abrasive composite precursors may not wet-out or adhere well to the temporary backing.

Advantageously, by using a water-soluble film as a temporary backing, it is possible to have good wetting and adhesion to the water-soluble film throughout the process. This results is several advantages: it retains the initial placement of the abrasive composite precursors, and it produces flat-topped abrasive composites (e.g., as discussed hereinabove).

The water-soluble film may be made of any material that dissolves in water. For easy handling, it may be preferred that the water-soluble film is soluble in heated water (e.g., greater than 45° C.), but not room temperature water. The water-soluble film may contain insoluble components (e.g., filler) as long as the film as a whole is generally soluble in water, thereby removing it from the abrasive composites. Examples of materials suitable for forming water-soluble films include partially and fully hydrolyzed polyvinyl acetates (commonly known as "polyvinyl alcohols" "PVA"). Other film-forming water-soluble polymers may also be used.

The abrasive composite precursor comprise a hardenable resin and abrasive particles. Optional solvent (water and/or organic solvent) may be added, for example, for viscosity control.

The hardenable resin may be thermosetting or non-thermosetting. Exemplary hardenable resins include glue, phenolic resin, aminoplast resin, urea-formaldehyde resin, melamine-formaldehyde resin, urethane resin, free-radically polymerizable polyfunctional (meth)acrylate (e.g., aminoplast resin having pendant α,β-unsaturated groups, acrylated urethane, acrylated epoxy, acrylated isocyanurate), epoxy resin (including bis-maleimide and fluorene-modified epoxy resins), isocyanurate resin, film forming polymer dispersions/latexes (e.g., polyurethane dispersions, poly(ethylene-co-vinyl acetate) dispersions, and acrylic dispersions), and combinations thereof.

Examples of useful abrasive particles include: fused aluminum oxide, heat treated aluminum oxide, white fused aluminum oxide, black silicon carbide, green silicon carbide, titanium diboride, boron carbide, tungsten carbide, titanium carbide, diamond, cubic boron nitride, garnet, fused alumina zirconia, sol gel abrasive particles, silica, iron oxide, chromia, ceria, zirconia, titania, silicates, metal carbonates (such as calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, aluminum trihydrate, graphite, metal oxides (e.g., tin oxide, calcium oxide), aluminum oxide, titanium dioxide) and metal sulfites (e.g., calcium sulfite), metal particles (e.g., tin, lead, copper), plastic abrasive particles formed from a thermoplastic material (e.g., polycarbonate, polyetherimide, polyester, polyethylene, polysulfone, polystyrene, acrylonitrile-butadiene-styrene block copolymer, polypropylene, acetal polymers, polyvinyl chloride, polyurethanes, nylon), plastic abrasive particles formed from crosslinked polymers (e.g., phenolic resins, aminoplast resins, urethane resins, epoxy resins, melamine-formaldehyde, acrylate resins, acrylated isocyanurate resins, urea-formaldehyde resins, isocyanurate resins, acrylated urethane resins, acrylated epoxy resins), and combinations thereof.

The abrasive particles may also be agglomerates or composites that include additional components, such as, for example, a secondary binder. Criteria used in selecting abrasive particles used for a particular abrading application typically include abrading life, rate of cut, substrate surface finish, grinding efficiency, and product cost.

Useful abrasive particles may also include shaped abrasive particles (e.g., precisely-shaped abrasive particles). Details concerning such abrasive particles and methods for their preparation can be found, for example, in U.S. Pat. No. 8,142,531 (Adefris et al.); U.S. Pat. No. 8,142,891 (Culler et al.); and U.S. Pat. No. 8,142,532 (Erickson et al.); and in U.S. Pat. Appl. Publ. No. 2012/0227333 (Adefris et al.); 2013/0040537 (Schwabel et al.); and 2013/0125477 (Adefris).

Abrasive composite precursors may further comprise optional additives such as abrasive particle surface modification additives, coupling agents, plasticizers, fillers, expanding agents, fibers, antistatic agents, initiators, suspending agents, photosensitizers, lubricants, wetting agents, surfactants, pigments, dyes, UV stabilizers, and suspending agents. The amounts of these materials are generally selected to provide the properties desired.

The amounts of each components to include is within the capability of those of ordinary skill in the art.

The abrasive composite precursors can generally be formulated by simple mixing of their components, and then disposing the mixture in discrete locations on the water-soluble film.

Abrasive composite precursors may be disposed on the water-soluble film by any suitable technique including, for example, roll coating, extrusion die coating, curtain coating, knife coating, gravure coating, screen printing, stencil coating, or spray coating. Stencil coating is one preferred method.

Exemplary porous backing may include wire screens, fiber scrims, knit fabrics, woven fabrics, stitchbonded fabrics, and perforated or non-perforated nonwoven fabrics (e.g., meltspun, spunlaced, or airlaid fiber webs (e.g., needletacked or having a prebond resin or thermal treatment to provide integrity)). Fabrics may comprise, for example, fibers and/or yarns comprising polyester, nylon, silk, cotton, and/or rayon. Fibers/threads in the porous backing may have any diameter. In some preferred embodiments, the fibers/threads have an average diameter of 10 to 1500 microns, preferably 100 to 1000 microns, and more preferably 50 to 500 microns.

In some embodiments, the porous backing may be knitted or woven in a network having intermittent openings. The openings may either be in a pattern or randomly spaced. The openings may be rectangular or have other shapes including a diamond shape, a triangular shape, a hexagonal shape, or a combination of shapes; however, this is not a requirement. The openings may have any size and/or shape. For example, the openings may have an average length and width that is 0.5 to 10 times the average diameter of the threads. In some embodiments, the porous backing may comprise the loop portion of a hook and loop fastening system.

Light pressure should be applied when contacting the abrasive composite precursors with the porous backing. It should be sufficient to ensure contact, but not to a degree that the abrasive composite precursors penetrate significantly into the porous backing (or through it). Typically, the downward force of a horizontal plastic plate or film is sufficient, although this is not a requirement. The most suitable force will vary depending on the porous backing and the composition of the abrasive composite precursors.

Hardening of the abrasive composite precursors may be accomplished by any suitable method including, for example, air drying, heat, and/or actinic electromagnetic radiation (e.g., ultraviolet and/or visible light).

SELECT EMBODIMENTS OF THE PRESENT DISCLOSURE

In a first embodiment, the present disclosure provides a method of making a coated abrasive article, the method comprising:
  disposing abrasive composite precursors on a major surface of a water-soluble film to provide a coated film, wherein the abrasive composite precursors comprise abrasive particles dispersed in a hardenable binder precursor;
  lightly contacting the abrasive composite precursors with a first major surface of a porous fibrous backing to provide a first laminate structure;
  hardening the hardenable binder precursor to provide a second laminate structure comprising abrasive composites; and
  dissolving the water-soluble film to provide the coated abrasive article.

In a second embodiment, the present disclosure provides a method according to the first embodiment, wherein the abrasive composite precursors are disposed on the major surface of the water-soluble film according to a predetermined pattern.

In a third embodiment, the present disclosure provides a method according to the second embodiment, wherein the predetermined pattern is discontinuous.

In a fourth embodiment, the present disclosure provides a method according to any of the first to third embodiments, wherein the hardenable binder precursor comprises an aqueous polyurethane dispersion.

In a fifth embodiment, the present disclosure provides a method according to any of the first to fourth embodiments, wherein the abrasive composite precursors are stencil-printed on the major surface of the water-soluble film.

In a sixth embodiment, the present disclosure provides a method according to any of the first to fifth embodiments, wherein the water-soluble film compriss a water-soluble polyvinyl alcohol.

In a seventh embodiment, the present disclosure provides a method according to any of the first to sixth embodiments, wherein the porous fibrous backing is nonwoven.

Objects and advantages of this disclosure are further illustrated by the following non-limiting examples, but the particular materials and amounts thereof recited in these examples, as well as other conditions and details, should not be construed to unduly limit this disclosure.

Example 1

Figure 2:
FIG. 2 is a digital micrograph of a coated abrasive article made in Example 1.

An Ultra Solvy Water Soluble Stabilizer (a polyvinyl alcohol) film available from Sulky of America, Kennesaw, Georgia has used as a porous water-soluble film. A slurry was manufactured containing 50 weight percent of polyurethane resin dispersion and 50 weight percent abrasive mineral. The slurry was pattern coated with a stencil and squeegee onto the water-soluble film. Coating was performed using a stencil (2 mm thickness) having an array of circular openings. The water-soluble film was placed coated-side down on to the unfluffy side of a brushed nylon porous backing. A Perspex (Darwen, Lancashire) plastic plate was placed on top of the backings to apply light pressure. The resulting laminate structure was heated in an oven for 10 mins at 75° C. The Perspex plate was then removed, and the coated backing was washed under a tap of water for a few mins to dissolve the water-soluble layer. After drying, a coated abrasive article was obtained, shown in FIG. 2. Inspection showed that the abrasive composites sat on the porous backing and has flat horizontal tops.

When rubbed by hand against a steel panel, scratches were made in the panel; and the resin dots stayed well adhered to the porous fiber backing.

The preceding description, given in order to enable one of ordinary skill in the art to practice the claimed disclosure, is not to be construed as limiting the scope of the disclosure, which is defined by the claims and all equivalents thereto.

What is claimed is:

1. A method of making a coated abrasive article, the method comprising:
    disposing abrasive composite precursors on a major surface of a water-soluble film to provide a coated film, wherein the abrasive composite precursors comprise abrasive particles dispersed in a hardenable binder precursor;
    lightly contacting the abrasive composite precursors with a first major surface of a porous fibrous backing to provide a first laminate structure;
    hardening the hardenable binder precursor to provide a second laminate structure comprising abrasive composites; and
    dissolving the water-soluble film to provide the coated abrasive article.

2. The method of claim 1, wherein the abrasive composite precursors are disposed on the major surface of the water-soluble film according to a predetermined pattern.

3. The method of claim 2, wherein the predetermined pattern is discontinuous.

4. The method of claim 1, wherein the hardenable binder precursor comprises an aqueous hardenable binder precursor.

5. The method of claim 1, wherein the abrasive composite precursors are stencil-printed on the major surface of the water-soluble film.

6. The method of claim 1, wherein the water-soluble film comprises a water-soluble polyvinyl alcohol.

7. The method of claim 1, wherein the porous fibrous backing is nonwoven.

* * * * *